United States Patent [19]

Dehnisch

[11] Patent Number: 4,565,384
[45] Date of Patent: Jan. 21, 1986

[54] MOTORCYCLE FORK TREE

[76] Inventor: Torbjörn Dehnisch, Vittangigatan 31, S-162 20 Vällingby, Sweden

[21] Appl. No.: 560,181

[22] Filed: Dec. 12, 1983

[51] Int. Cl.$^4$ .............................................. B62K 21/04
[52] U.S. Cl. ..................................... 280/279; 280/280
[58] Field of Search ............... 280/279, 278, 274, 275, 280/276, 277, 280, 283, 287

[56] References Cited

U.S. PATENT DOCUMENTS

| 4,032,168 | 6/1977 | Emerson | 280/279 |
| 4,479,661 | 10/1984 | Weigl | 280/279 |

FOREIGN PATENT DOCUMENTS

| 1084795 | 7/1954 | France | 280/279 |
| 870236 | 10/1981 | U.S.S.R. | 280/279 |

Primary Examiner—Joseph F. Peters, Jr.
Assistant Examiner—Mitchell J. Hill
Attorney, Agent, or Firm—Oblon, Fisher, Spivak, McClelland & Maier

[57] ABSTRACT

A motorcycle fork tree assembly includes a steering axle attached to a top tree piece and a bottom inner tree piece. The bottom inner tree piece is pivotally secured to a bottom intermediate tree piece which is adjustably positioned within a bottom outer tree piece. The fork tubes extend through the bottom outer tree piece and are attached to the top tree piece via plugs having offset bores positioned in one of a number of threaded holes of the top tree piece. The degree of trail of the steering assembly for the motorcycle can be easily and quickly adjusted by the independent adjustment of one or more of the bottom outer tree piece relative to the bottom inner tree piece or the plugs in the top tree piece.

7 Claims, 3 Drawing Figures

MOTORCYCLE FORK TREE

BACKGROUND OF THE INVENTION

1. Field of the Invention

The present invention relates to the fork tree used to connect the fork of a motrocycle to the motorcycle body steering head.

2. Description of the Prior Art

An important consideration in the design of the front fork assembly of a motorcycle is the degree of "trail" exhibited by the fork. The trail can be defined as the horizontal distance by which a vertical plane passing through the front wheel axis W trails the point of intersection of the steering axis A with the ground. The trail is shown and designated as "T" in FIG. 1.

In order to optimize the riding characteristics of the motorcycle, the size of the trail must be correctly set. If the trail is too large, the motorcycle is stable at high speed, but is oversteered and hard to balance at low speeds and in curves. If, on the other hand, the trail is too small, or is negative, the motorcycle is easy to steer at low speeds, but has no self steering properties at high speed, and may wobble. Generally, with a correct trail value of between 5 and 15 cm, the motorcycle is easy to handle at low speed and follows curves with no wobble at high seed.

However, in conventional motorcycles the precise setting of the trail is difficult to set, since it depends upon many factors such as the length of the fork tubes and the point of balance of the motorcycle. This is particular true for "chopper" type motorcycles having long fork tubes.

It has been knwon to adjust the trail value of motorcycle by adjusting the spacing beteen diferent elements of the steering structure. This has been conventionally performed in one of two ways. One known way has been to form the adjustment of the parts in steps, followed by inspection after each step. However, since the distances between steps have been long, it has not been possible to obtain a correct trail value, especially in choppers having long fork tubes. Conventionally, the motorcycle fork tubes are connected to the steering head H by a fork tree assembly consisting of a single part. In such conventional arrangements, an attempt to modify the trail value was performed by extending the part corresponding to that having the hole 6a in FIG. 2 rearward (downward as seen in FIG. 3) in providing this part with a second hole parallel to the hole 6a. By inserting a pin in the second hole, the distance between the parts was increased and thereby the trail was changed.

Another known way to change the trail value was to perform a stepless infinitely variable adjustment. This technique is shown in U.S. Pat. No. 3,866,946 and U.S. Pat. No. 4,082,307. However, it was not known to perform such a stepless adjustment in a fork tree of the type used in the present invention, nor was known to perform the trail adjustment by means of the elements of the present invention.

SUMMARY OF THE INVENTION

It is an object of the present invention to provide a motorcycle fork tree assembly which will permit stepless adjustment of the trail value in a simple and rapid manner.

According to present invention, the fork tree assembly consists of an axle attached to a top tree piece and a bottom inner tree piece. The bottom inner tree piece is pivoted to a bottom intermediate tree piece which is adjustably locked onto a bottom outer tree piece. The fork tubes pass through the bottom outer tree piece and terminate in fork plugs having offset holes. The offset holes of the fork plugs can be secured to one of three bolt holes in the top tree piece. Therefore, by the adjustment of the intermediate tree piece on the outer tree piece, by the orientation of the offset holes of the tree plugs, and by the securement of the tree plugs to the appropriate bolt holes in the top tree piece, one can quickly and accurately adjust the value of the trail.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
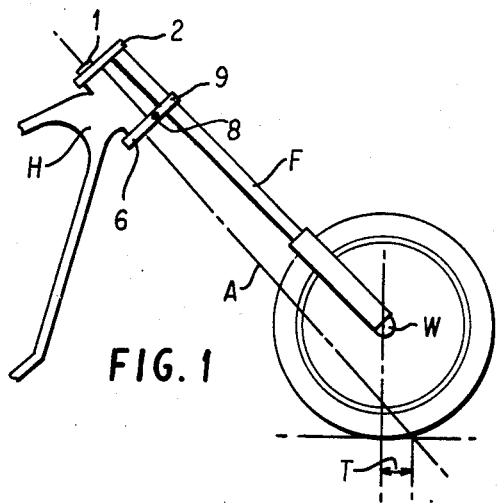
FIG. 1 is a schematic view showing a motorcycle fork and fork tree assembly.

The present invention will know be described with reference to the attached figures, in which the same reference numerals will be used to designate the same or corresponding elements throughout the several views.

In a motorcycle, the body of the motorcycle terminates in a fork head H having a bore through which an axle 5 of the fork tree assembly extends. The front wheel of the motorcycle is attached to the fork tubes F' and F" at axle W. The fork tubes extend upward for attachment to the fork tree assembly. As a result, upon the application of forces to the handle bars which are rigidly fixed to the fork tree assembly, the fork tubes and front wheel will rotate about a turning axis A coaxial with the axle 5. This axis is fixed; however by adjustment of the securement of the fork tubes, the degree of trail can be varied.

Figure 2:
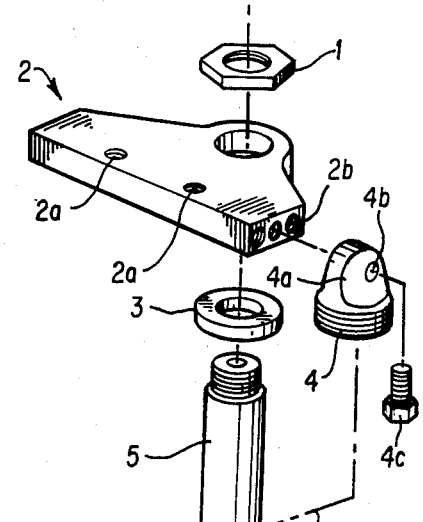
FIG. 2 is an exploded orthoganol view of the fork tree assembly of the present invention.
Figure 3:
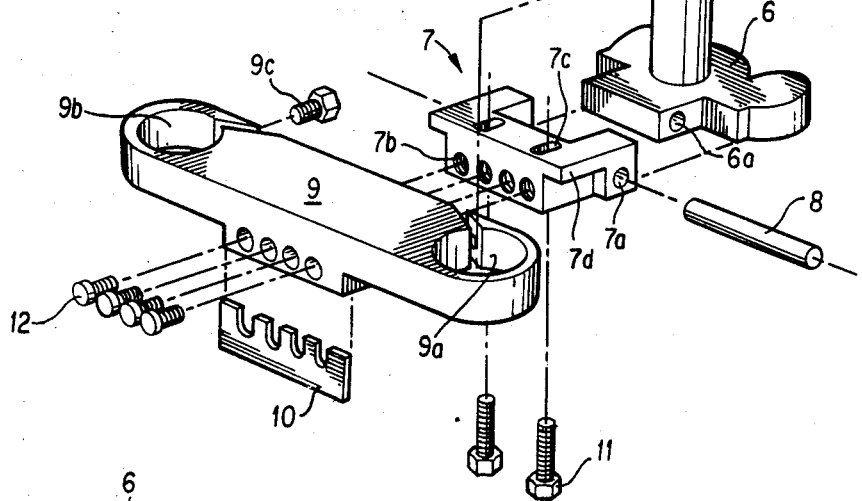
FIG. 3 is a bottom view of the assembled fork tree assembly of FIG. 2.
Figure 3:
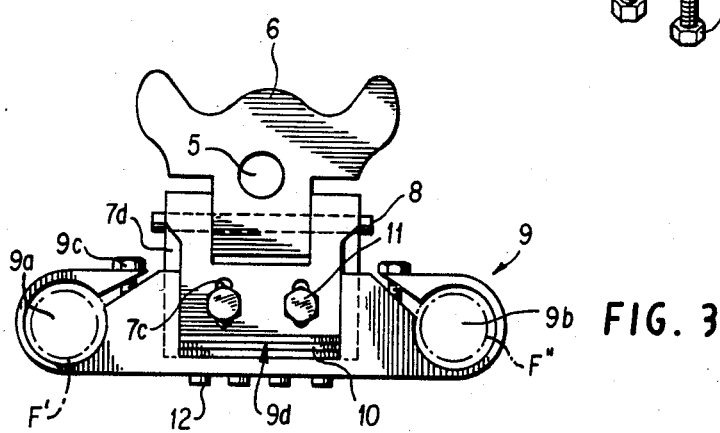

As seen in FIGS. 2 and 3, the steering axle 5 which is pivotable within the steering head includes bearings to permit rotation thereof. One bearing 3 is shown in FIG. 2. A top tree piece 2 is fixed to the top of the axle 5 by a nut 1. Motorcycle handle bars are secured to this top tree piece, as by mounting within the holes 2a. Each of the lateral sides of the top tree piece are provided with an array of threaded holes 2b, the purpose of which will be described below.

The bottom of the steering axial is fixed to a bottom inner tree piece as can be seen in FIG. 1, the top tree piece 2 and the bottom inner tree piece 6 are respectively positioned above and below the steering head H so that the steering axle 5 is locked onto the motorcycle. The bottom inner tree piece 6 has an extended portion including a bore 6a extending entirely therethrough.

A bottom intermediate tree piece 7 has a generally U-shape. A pair of coaxial bores 7a extend through each of the legs of the U-shaped bottom intermediate tree piece 7, so that the legs can be aligned on either side of the extended portion of the bottom inner tree piece 6 with the bores 6a and 7a in alignment. As a result, a pin 8 can be extended through the bores 6a and 7a, and fixed, so as to pivotably attach the bottom inner and intermediate tree pieces to one another.

The bottom intermediate tree piece is provided with a plurality of threaded holes 7b on a face opposite the bottom inner tree piece. Elongated slots 7c extend through the base of the bottom intermediate tree piece.

The lateral sides of the bottom intermediate tree piece 7 are provided with cut outs that define guide portions or ribs 7d which extend in a direction mutually perpendicular, or orthogonally, to the steering or turning axis A and the axis of bore 6a, the purpose of which will be described below.

A bottom outer tree piece 9 is in the form of an elongated bar having holes 9a and 9b at each end through which the fork tubes F' and F" can extend. Bolts 9c can be tightened to lock the forks within the holes 9a and 9b.

Fork tube plugs 4 have threaded bases which can be threaded into the tops of the fork tubes. Each of the plugs 4, only one of which is shown, has an ear 4a with a bore extending therethrough, the bore being offset to one side with respect to the center of the ear. A bolt 4c can extend through the bore 4b and be threaded into one of the threaded holes 2b of the top tree piece 2.

The bottom outer tree piece 9 is provided with a recess 9d whose shape corresponds to that of the bottom intermediate tree piece 7 so that the intermediate tree piece 7 can slide into this recess (in the downward direction, as seen in FIG. 3). The guide ribs 7d slide in correspondingly shaped slots (not numbered) in the recess and prevent relative movement between pieces 7 and 9 except along the sliding direction. The degree of sliding of the bottom intermediate tree piece into the bottom outer tree piece is infinitely adjustable and the bottom intermediate tree piece can be locked relative to the bottom outer tree piece by tightening the bolts 11 which extend through the elongated slots 7c and which are threaded into threaded holes (not shown) of the bottom outer tree piece. In order to ensure that the security of the positioning of the bottom intermediate tree piece, a plurality of shims 10 can be used to fill that portion of the recess 9d which is not filled by the bottom intermediate tree piece. Bolts 12, passing through bores in the bottom outer tree piece and threaded into the threaded holes 7b lock the bottom intermediate tree piece against the shims.

The above structure provides at least three independently adjustable arrangements for adjusting the degree of trail. The fork tubes are pivoted on a fulcrum defined by the bottom tree pieces. The degree of extension of these bottom tree pieces can be adjusted by loosening the bolts 11 and 12, sliding the intermediate tree piece within the recess of the bottom outer tree piece so as to provide a desired degree of separation between the bottom outer tree piece and the bottom inner tree piece, followed by adjustment of the number of shims 10 within the recess 9d to fill the recess, and the retightening of the bolts 11 and 12.

One can also adjust the point of attachment of the tops of the fork tubes to the top tree piece. This can be done by rotating the plugs 4 by 180° if desired and, in addition, selecting the threaded hole 2b into which the bolt 4c is to be secured. This provides up to 6 positions for the attachment of the tops of the fork tubes to the top tree piece. By the selective use of one or more of these adjustment arrangements, the value of the trail can be accurately adjusted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States:

1. A fork tree assembly for a motorcycle, said fork tree assembly comprising:
   a steering axle rotatably mountable in a steering head of said motorcycle along a steering axis;
   a top tree piece fixed to a top end of said steering axle;
   a bottom inner tree piece fixed to a bottom end of said steering axle, said bottom inner piece having a first bore along a first axis transverse to said steering axis;
   a bottom intermediate tree piece pivotally mounted on said bottom inner piece about said first axis, said bottom intermediate piece having guide portions extending in a first direction orthogonal to said steering axis and first axis;
   a bottom outer tree piece to which fork tubes are securable, said bottom outer piece having a first portion shaped to correspond to said guide portions so that said guide portions can slidably engage said first portion along said first direction;
   and means for selectively securing said bottom intermediate and bottom outer tree pieces to one another relative to said first direction, whereby said bottom intermediate and bottom outer tree pieces are fixed to one another with selective adjustment in said first direction.

2. The assembly of claim 1 wherein said first portion of said bottom outer piece comprises a recess in said bottom outer piece, said recess having a shape corresponding to a shape of said bottom intermediate piece at said guide portions.

3. The assembly of claim 2 wherein said guide portions comprise lateral ribs extending from said bottom intermediate piece along a plane parallel to a plane defining said first axis and fitting into corresponding slots of said recess.

4. The assembly of claim 2 wherein said means for securing comprise a plurality of shims shaped to fit that portion of said recess not filled by said bottom intermediate piece.

5. The assembly of claim 4 wherein said means for securing further comprise:
   first bolts securing said bottom intermediate piece to said bottom outer piece in said first direction with said shims therebetween; and
   second bolts securing said bottom intermediate piece to said bottom outer piece in a direction orthogonal to said first direction.

6. The assembly of claim 1, further comprising:
   a plurality of threaded holes on each lateral side of said top piece, said plurality of threaded holes extending in a direction parallel to said first axis;
   a plug threadably securable to a top of each said fork tube for permitting rotation of said plug in said fork tube about a rotating axis, each said plug having a portion including a bore offset from said rotating axis; and third bolts passing through said bores offset from said axes for securing said plugs to respective ones of said threaded holes.

7. A fork tree assembly for a motorcycle, said fork tree assembly comprising:
- a steering axle rotatably mountable in a steering head of said motorcycle along a steering axis;
- a top tree piece fixed to a top end of said steering axle;
- a bottom inner tree piece fixed to a bottom end of said steering axle, said bottom inner piece having a first bore along a first axis transverse to said steering axis;
- a bottom intermediate tree piece pivotally mounted on said bottom inner piece about said first axis;
- a bottom outer tree piece to which fork tubes are securable, said bottom outer tree piece being connected to said bottom intermediate tree piece;
- at least one threaded hole on each lateral side of said top piece, said hole extending in a direction parallel to said first axis;
- a plug securable to a top of each said fork tube for permitting rotation of said plug relatively to said fork tube about a rotating axis, each said plug having a portion including a bore offset from said rotating axis; and
- bolts passing through said bores offset from said axis for securing said plugs to respective ones of said threaded holes.

* * * * *